Sept. 5, 1939.  J. W. ORELUP  2,172,220
NEGATIVE INTEGRATOR
Filed Oct. 15, 1936
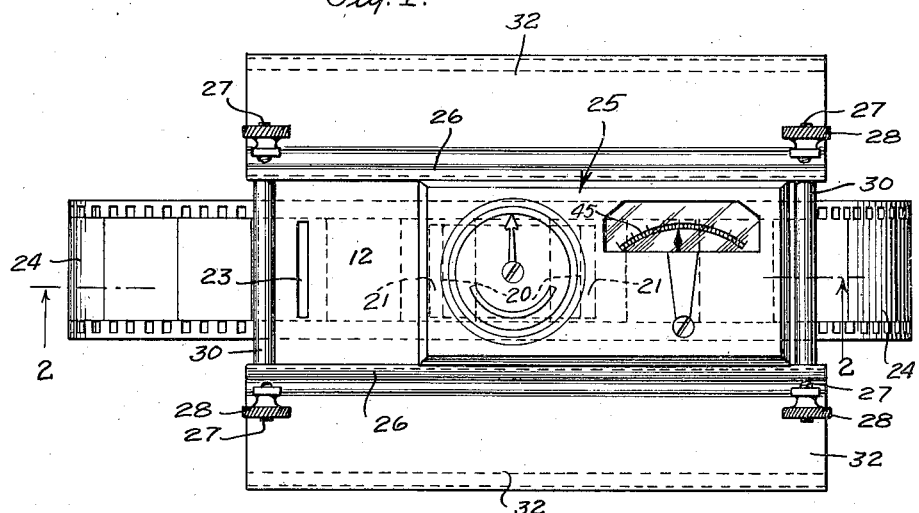
Fig. 1.
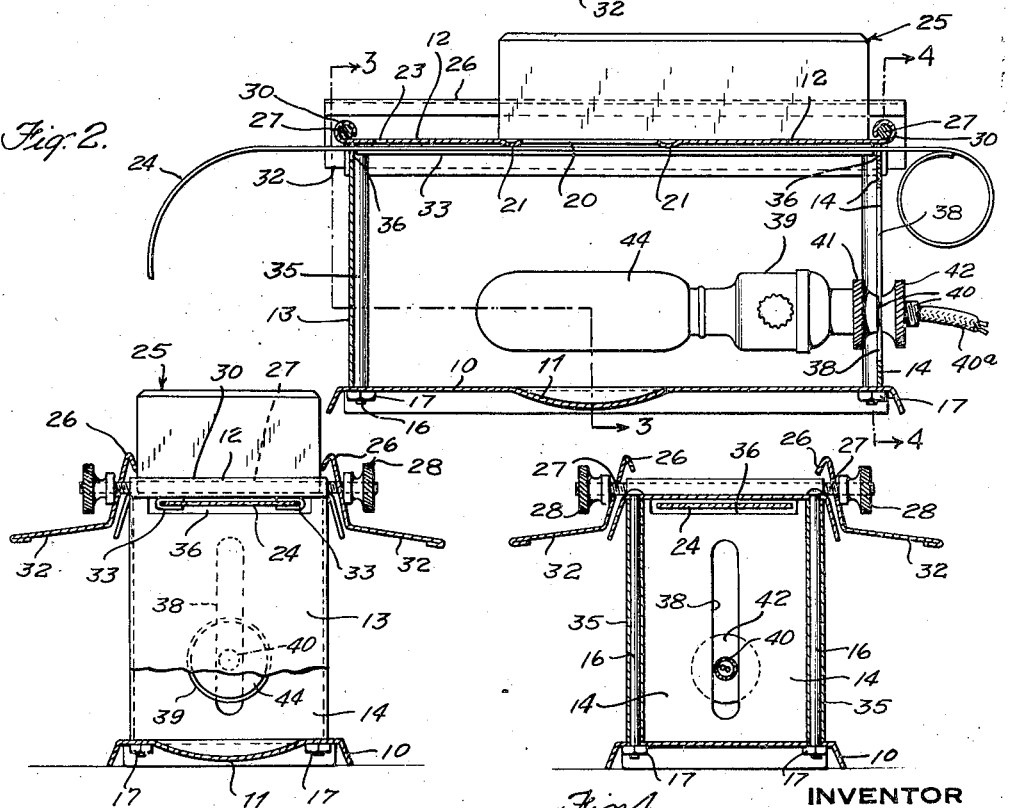
Fig. 2.
Fig. 3.
Fig. 4.
INVENTOR
JOHN W. ORELUP.
BY Moses & Holt
ATTORNEYS Patented Sept. 5, 1939

2,172,220

UNITED STATES PATENT OFFICE 2,172,220

NEGATIVE INTEGRATOR

John W. Orelup, Summit, N. J.

Application October 15, 1936, Serial No. 105,691

1 Claim. (Cl. 88—14)

My present invention relates to improved means and apparatus for determining quantitatively the characteristics of photographic negatives from which characteristics the exposure time for the making of enlargements of said negatives and of the printing time for the making of contact prints therefrom may be accurately determined, as well as other values, as will be hereinafter pointed out.

My present invention is based upon my observation that the darkest portion of the negative will not vary in density more than a small ratio from the clearest portion, whereby the average density of the entire negative will be a measure of the correct printing time to register detail in the highest light and deepest shadow within the limitations of both paper and negative. While the invention is not limited thereto, it has been developed in respect of, and is therefore particularly applicable to, the evaluation of so called miniature camera negatives.

The invention will be best understood by reference to the following detailed description taken with the accompanying drawing, and the features of novelty will be pointed out in the appended claim.

In the drawing, Fig. 1 is a plan view of a preferred embodiment of the invention with a strip of photographic negatives in place.

Fig. 2 is a view in section taken on line 2—2 of Fig. 1.

Fig. 3 is a view of a section taken along line 3—3 of Fig. 2.

Fig. 4 is a view taken along line 4—4 of Fig. 2.

In carrying out my invention I provide an improved film holding device by which successive negatives can be moved across a window on one side of which is disposed a source of light of fixed intensity and uniformity, and on the other side a photoelectric exposure meter of known type whereby such meter will be responsive to the average light density of the entire negative the photographic portion of which is of the same size as the window.

As shown in the drawing, the device comprises a box-like structure comprising a bottom piece 10 containing preferably a concave reflecting portion 11 and a top piece 12 connecting which are end pieces 13 and 14, the whole being suitably held together by means of bolts 16 and nuts 17. The top, bottom and side pieces are conveniently of metal and may be of nickel or chromium plated, especially the top surface of the bottom piece 10 and reflector 11, whereby such surface will be highly reflecting. The top piece 12 has in the middle portion thereof a window 20 the size of the negative to be measured, while at one end thereof it has a narrow observation slot 23 the approximate size of the space between the negatives which most conveniently are maintained in the original strip 24 until after evaluation in my improved device. The convex portions 21—21 of the top piece aid in threading the film through the device. Means are provided for securing in place a photoelectric exposure meter 25 so that the exposure meter window, not shown, matches the framing window 20, such means in the embodiment shown taking the form of spring metal clamps 26 which are held in place by means of bolts 27 at either end of the device together with nuts 28, the bolts 27 passing through turned over ends 30 of the plates 13 and 14, respectively. By taking up on the nuts 28 the clamps 26 are brought against the exposure meter 25 and hold same in place. The clamps 26 also terminate in portions 32, acting as shields for the light. Secured to the under surface of the top piece 12 are U shaped film guides 33—33, which guides extend the length of the cover of the top piece 12.

The side edges of the end pieces 13 and 14 may also be turned over, thereby providing tubes 35 to contain the bolts 16. Said ends 13 and 14 also have at the top thereof a slot 36 to accommodate the film. End piece 14 is provided with a slot 38 in which is held the lamp socket 39 by means of a threaded hollow boss 40 (through which passes the lamp cord 40a) and holding-nuts 41—42 on said boss. By loosening nut 42, for example, the light socket 39 containing bulb 44 may be adjusted toward or away from the window 20. Bulb 44 is preferably of elongated shape to correspond with that of the window 20 and constituting, given constant house voltage, a light source which is substantially constant.

In use, the photoelectric exposure meter, which may be the well known Weston type, is clamped in position and the lamp turned on. In a few moments the needle of the photometer 25 will reach a steady value on the scale 45, the position of the lamp 44 being adjusted to give a proper initial reading. The film strip to be measured is then inserted in the guides 33 and the first picture is framed in the window 20 by observing the film from beneath. After this all the following pictures are framed most conveniently by bringing the clear space between the negatives in line with the edge of the observation slot 23. Readings of the light transmission value of each negative are then noted progressively on a record sheet. Since the film comes into contact with the device only at the grooves or guides 33 which cover only the nonprinting portions of the negative, there is no danger of injury to the film by scratching.

Having thus observed the light transmitting values of each negative and knowing the optimum printing time of any one of these negatives, that of the others may be calculated roughly in proportion to their light transmitting values, as will be clearly understood by those skilled in the art. In addition, the value given by the exposure meter is a guide to the kind of printing paper to be used, that is, whether soft or hard, and also if the negative has been fogged or badly overexposed such facts will be revealed by the exposure number.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

In a device for evaluating the printing time of photographic negatives, a frame, a light source held within the frame, means for framing the entire negative to be evaluated, comprising a window in the frame, in combination with a photoelectric light measuring device disposed on said frame on the opposite side of said window from said light source and covering said window, means for feeding a strip of photographic negatives past said window between said light source and the portion of said frame on which said photoelectric measuring device is disposed, and means for positioning the negatives comprising a narrow opening arranged transversely of the path of the film in a portion of the frame not covered by said light measuring device, the edge of said transverse opening nearest the said window being positioned at a distance from said window substantially equal to the width of a whole number of individual negatives.

JOHN W. ORELUP.